US011411919B2

(12) United States Patent
Landriot et al.

(10) Patent No.: US 11,411,919 B2
(45) Date of Patent: Aug. 9, 2022

(54) DEEP PACKET INSPECTION APPLICATION CLASSIFICATION SYSTEMS AND METHODS

(71) Applicant: EXFO Solutions SAS, Saint-Jacques-de-la-Lande (FR)

(72) Inventors: Alexis Landriot, Piré-Chancé (FR); Thierry Jacq, Rennes (FR)

(73) Assignee: EXFO Solutions SAS, Saint Jacques-de-la-lande (FR)

( * ) Notice: Subject to any disclaimer, the term of this patent is extended or adjusted under 35 U.S.C. 154(b) by 0 days.

(21) Appl. No.: 17/025,140

(22) Filed: Sep. 18, 2020

(65) Prior Publication Data

US 2021/0099429 A1  Apr. 1, 2021

Related U.S. Application Data

(60) Provisional application No. 62/908,901, filed on Oct. 1, 2019.

(51) Int. Cl.
*H04L 29/06* (2006.01)
*H04L 9/40* (2022.01)
(52) U.S. Cl.
CPC ...... *H04L 63/0263* (2013.01); *H04L 63/0236* (2013.01)
(58) Field of Classification Search
CPC .................. H04L 63/0236; H04L 63/2063
See application file for complete search history.

(56) References Cited

U.S. PATENT DOCUMENTS

| 7,409,708 | B2 | 8/2008 | Goodman et al. |
| 7,684,394 | B1 | 3/2010 | Cutbill et al. |
| 7,814,204 | B1 | 10/2010 | Wang et al. |
| 7,953,850 | B2 | 5/2011 | Mani et al. |
| 8,347,394 | B1 | 1/2013 | Lee |
| 8,484,338 | B2 | 7/2013 | Paster |
| 8,819,227 | B1 * | 8/2014 | Keralapura ............ H04L 45/38 709/224 |
| 9,124,627 | B2 | 9/2015 | Bharali et al. |

(Continued)

FOREIGN PATENT DOCUMENTS

| EP | 2933955 A1 | 10/2015 |
| WO | 2014101848 A1 | 7/2014 |
| WO | 2016151311 A1 | 9/2016 |

OTHER PUBLICATIONS

Feb. 10, 2021, European Search Report for European Patent Application No. EP 20 19 8723.

(Continued)

*Primary Examiner* — Vance M Little
(74) *Attorney, Agent, or Firm* — Clements Bernard Baratta; Lawrence A. Baratta, Jr.

(57) ABSTRACT

Deep Packet Inspection (DPI) application classification systems and methods are presented to enrich and improve application classification. Specifically, the systems and methods utilize domain and hostname information to enrich the DPI application classification. The systems and methods can include obtaining a packet; determining a hostname associated with the packet; utilizing a main rule to extract a domain from the hostname; and analyzing the domain and the hostname with a plurality of secondary rules based on the domain to deduce an application therefrom.

17 Claims, 6 Drawing Sheets

(56) References Cited

U.S. PATENT DOCUMENTS

| | | |
|---|---|---|
| 9,253,068 B1 | 2/2016 | Wu et al. |
| 9,419,942 B1* | 8/2016 | Buruganahalli .... H04L 63/0236 |
| 9,762,457 B2 | 9/2017 | Chastain |
| 9,813,377 B2 | 11/2017 | Durie et al. |
| 9,917,852 B1 | 3/2018 | Xu et al. |
| 10,044,620 B2 | 8/2018 | Dillion |
| 10,084,814 B2 | 9/2018 | Fakeri-Tabrizi et al. |
| 10,162,970 B2 | 12/2018 | Olson et al. |
| 10,296,748 B2 | 5/2019 | Telang et al. |
| 10,332,005 B1 | 6/2019 | Liao et al. |
| 10,341,241 B2 | 7/2019 | Su et al. |
| 10,404,756 B2 | 9/2019 | Narayanaswamy et al. |
| 10,505,985 B1* | 12/2019 | Walter .................... H04L 69/22 |
| 2009/0319659 A1* | 12/2009 | Terasaki ............. H04L 63/1416 709/224 |
| 2011/0145902 A1 | 6/2011 | Kim et al. |
| 2015/0350229 A1 | 12/2015 | Mitchell |
| 2017/0078922 A1 | 3/2017 | Raleigh et al. |
| 2017/0288987 A1* | 10/2017 | Pasu ................... H04L 63/1408 |
| 2018/0077110 A1 | 3/2018 | Houston, III et al. |
| 2018/0089561 A1 | 3/2018 | Oliner et al. |
| 2018/0218037 A1 | 8/2018 | Marquardt et al. |
| 2018/0375745 A1 | 12/2018 | Balupar |
| 2019/0149449 A1 | 5/2019 | Morris |
| 2019/0327154 A1* | 10/2019 | Sahoo ................... H04L 43/045 |
| 2020/0366648 A1* | 11/2020 | Kuppannan ......... H04L 63/0236 |

OTHER PUBLICATIONS

G. Rodrigues et al., "Cybersecurity and Network Forensics: Analysis of Malicious Traffic towards a Honeynet with Deep Packet Inspection," Applied Sciences Article, Oct. 18, 2017, pp. 1-29.

J. Davis et al., "Data Preprocessing for Anomaly Based Network Intrusion Detection: A Review," Feb. 3, 2011, pp. 1-36.

A. Raghuramu et al., "Uncovering Footprints of Malicious Traffic in Wireless/Mobile Networks," Publication Date Apr. 1, 2016, pp. 1-39.

* cited by examiner

| Deactivated Application | Number | ratio | SUM of Volume | ratio Volume | Activated Application | Number | ratio | SUM of Volume | ratio Volume |
|---|---|---|---|---|---|---|---|---|---|
| (empty) | 87,232 | 75.51% | 1,098,090,822 | 18.45% | (empty) | 74,045 | 64.10% | 206,405,965 | 3.47% |
| facebook | 5,313 | 4.60% | 84,113,580 | 1.41% | facebook | 5,315 | 4.60% | 84116654 | 1.41% |
| google-services | 4,016 | 3.48% | 99,662,541 | 1.67% | google-services | 4,016 | 3.48% | 99662541 | 1.67% |
| google-apis | 2,113 | 1.83% | 324,924,762 | 5.46% | google-apis | 2,117 | 1.83% | 324924762 | 5.46% |
| google-ads | 1,812 | 1.57% | 38,905,699 | 0.65% | google-ads | 1,812 | 1.57% | 38905699 | 0.65% |
| whatsapp | 1,553 | 1.34% | 277,442,905 | 4.66% | whatsapp | 1,553 | 1.34% | 277442905 | 4.66% |
| youtube | 1,439 | 1.25% | 1,316,645,639 | 22.00% | youtube | 1,439 | 1.25% | 1316645639 | 22.12% |
| google-mail | 1,415 | 1.22% | 39,039,924 | 0.66% | google-mail | 1,415 | 1.22% | 39039924 | 0.66% |
| instagram | 988 | 0.86% | 672,877,904 | 11.30% | instagram | 988 | 0.86% | 672877904 | 11.30% |
| facebook-cloud | 948 | 0.82% | 400,060,450 | 6.72% | facebook-cloud | 948 | 0.82% | 400060450 | 6.72% |
| google-play | 919 | 0.80% | 202,877,744 | 3.41% | google-play | 919 | 0.80% | 202877744 | 3.41% |
|  |  |  |  |  | kontagent | 807 | 0.70% | 859106 | 0.01% |
|  |  |  |  |  | truecaller | 730 | 0.63% | 4870715 | 0.08% |
| amazon-cloud | 435 | 0.38% | 39,756,513 | 0.67% | icloud | 606 | 0.52% | 169373697 | 2.85% |
| yahoo | 395 | 0.34% | 11,277,018 | 0.19% | twitter | 574 | 0.50% | 47866812 | 0.80% |
| xvideos | 390 | 0.34% | 184,950,399 | 3.11% | google-analytics | 552 | 0.48% | 4606894 | 0.08% |
| amazon-cloud | 435 | 0.38% | 39,756,513 | 0.67% | microsoft-services | 528 | 0.46% | 9948816 | 0.17% |
|  |  |  |  |  | appsflyer | 518 | 0.45% | 3259287 | 0.05% |
|  |  |  |  |  | mozilla | 513 | 0.44% | 3770242 | 0.06% |
|  |  |  |  |  | samsungcloud | 493 | 0.43% | 6834876 | 0.11% |
|  |  |  |  |  | bounce | 461 | 0.40% | 7169262 | 0.12% |
| amazon-cloud | 435 | 0.38% | 39,756,513 | 0.67% | amazon-cloud | 435 | 0.38% | 39756513 | 0.67% |
| yahoo | 395 | 0.34% | 11,277,018 | 0.19% | yahoo | 395 | 0.34% | 11277018 | 0.19% |
| xvideos | 390 | 0.34% | 184,950,399 | 3.11% | xvideos | 390 | 0.34% | 184950399 | 3.11% |
| Total | 115,517 | 100.00% | 5,952,843,768 | 100.00% |  | 115,517 | 100.00% | 5,952,843,768 | 100.00% |

FIG. 2

| DPI Application | Hostname | Number | SUM of volume |
|---|---|---|---|
| blogspot | somaudioguy.blogspot.com | 1 | 24728 |
| bounce | api.bounce.com | 172 | 3063389 |
| bounce | cdn.bounce.com | 289 | 4105873 |
| confirmgist | confirmgist.com | 1 | 5389 |
| dailytrust | images.dailytrust.com | 17 | 673594 |
| dailytrust | www.dailytrust.com | 14 | 163785 |
| daylight | daylight.com | 1 | 110229 |
| fidelitybank | fideltypaygate.fidelitybank.com | 6 | 611289 |
| google | adservice.google.com | 59 | 440108 |
| google | ampcid.google.com | 4 | 32287 |
| google | clients1.google.com | 1 | 1530 |
| hotels | hotels.com | 6 | 319898 |
| jiji | api.jiji.com | 8 | 104105 |
| jiji | images2.jiji.com | 1 | 14046 |
| jiji | images3.jiji.com | 1 | 34731 |
| jumia | www.jumia.com | 1 | 28783 |
| lifestyle | lifestyle.com | 1 | 1736 |
| mimo | adserver.mimo.com | 1 | 5367 |
| naija | pixel.naija.com | 4 | 36129 |
| naija | www.naija.com | 7 | 178550 |
| pulse | www.pulse.com | 1 | 7203 |
| thecable | ads.thecable.com | 12 | 80069 |
| thecable | thecable.com | 22 | 55599 |
| thecable | www.thecable.com | 30 | 2579531 |
| watchlocker | watchlocker.com | 4 | 1262268 |
| Total | | 664 | 13940216 |

*FIG. 3*

Simple Extraction

| Hostname | DPI Application | Number |
|---|---|---|
| adservice.google.com | google | 59 |
| ampcid.google.com | google | 4 |
| clients1.google.com | google | 1 |
| external.flos1-1.fna.fbcdn.net | fbcdn | 1 |
| scontent.flos1-1.fna.fbcdn.net | fbcdn | 3 |
| static.ads-twitter.com | ads-twitter | 1 |
| support.google.com | google | 1 |
| Total | | 70 |

Extraction + Refinement

| Hostname | DPI Application | Number |
|---|---|---|
| adservice.google.com | google-ads | 59 |
| ampcid.google.com | google-services | 4 |
| clients1.google.com | google-services | 1 |
| external.flos1-1.fna.fbcdn.net | facebook-cloud | 1 |
| scontent.flos1-1.fna.fbcdn.net | facebook-cloud | 3 |
| static.ads-twitter.com | twitter | 1 |
| support.google.com | google-services | 1 |
| Total | | 70 |

*FIG. 4*

Setting file: 1 MAIN rule + 147 secondary rules
Configuration for DPI: Domainname to Application
to activate, apply the filename of this file in pnp.conf, section [TCPDR], parameter 'DpiDomain2App.file' (for use terminal command)

| MATCH | PATTERN | APPLICATION | COMMENT |
|---|---|---|---|
| MAIN | (?=A-)\.)*(?<name>[A-}+)(?=(?:[A-}:co]com|edu|gc|go|gov) mob|net|or|org|os|uc|biz})[A-]e-z]{2,}}$) | MAIN | parse hostname to extract main part |
| fb | | facebook | if parse==fb, default application is facebook |
| fbcdn | instagram\.[^.]* | instagram | if parse==fbcdn, check whether hostname contains instagram pattern, then application is instagram |
| fbcdn | fna.fbcdn | facebook-cloud | if parse==fbcdn, check whether hostname contains fna pattern, then application is facebook-cloud |
| fbcdn | | facebook | if parse==fbcdn, default application is facebook |
| githubusercontent | | github | |
| gmail | | google-mail | |
| goo | goo.gl | google-services | |
| google | mail | google-mail | |
| google | drive | google-drive | |
| google | mtalk | google-hangout | |
| google | calendar | google-calendar | |
| google | plus | google-plus | |
| google | adservice | google-ads | |
| google | android | google-play | |
| google | | google-services | |
| googleadservices | | google-ads | |
| googleapis | maps1 | google-maps | |
| googleapis | play1 | google-play | |
| googleapis | storage1 | google-cloud | |
| googleapis | youtubei | youtube | |
| googleapis | instantmessaging-pa1 | google-allo | |
| googleapis | | google-apis | |
| googlesyndication | | google-ads | |
| googletagmanager | | google-analytics | |
| googletagservices | | google-analytics | |
| googleusercontent | | google-cloud | |
| googlevideo | | youtube | if parse==googlevideo, default application is youtube |
| googzip | | google-services | |
| gstatic | | google-services | |

FIG. 5

DEEP PACKET INSPECTION APPLICATION CLASSIFICATION SYSTEMS AND METHODS

CROSS-REFERENCE TO RELATED APPLICATION(S)

The present disclosure claims priority to U.S. Provisional Patent Application No. 62/908,901, filed Oct. 1, 2019, the contents of which are incorporated by reference in their entirety.

FIELD OF THE DISCLOSURE

The present disclosure generally relates to networking. More particularly, the present disclosure relates to Deep Packet Inspection (DPI) application classification systems and methods.

BACKGROUND OF THE DISCLOSURE

Deep Packet Inspection (DPI) involves analyzing details of packets transmitted in a network, e.g., analyzing header details, etc. For example, DPI can be part of a network monitoring system. DPI can be used in a wide range of applications, such as for network management, network monitoring, security functions, data mining, eavesdropping, policy enforcement, etc. One aspect of DPI can include identifying an underlying application associated with a packet. For example, application type is a particularly useful metric in the context of network monitoring systems. Conventional DPI techniques yield a low DPI application classification rate. Based on field experience with network monitoring systems that capture and monitor traffic, as much as 75% of Call Detail Records (CDRs) and more than 18% of traffic volume is listed as an "unknown" application. As is known in the art, CDRs are data records that capture specific data about a transaction, namely a Web transaction. Various existing DPI solutions provide application classification for well-known user applications such as, for example, YouTube, Facebook, FaceTime, Outlook, etc., or for various top Web applications such as, for example, sites listed in the Alexa ranking. The challenge for network monitoring systems is to provide telecom carrier customers a clear view of all sites visited by end-users, including local sites and specific sites accessed through Content Delivery Networks (CDNs). It is insufficient to have a large number of applications classified as "unknown." That is, it is simply inadequate to have a large volume of traffic recorded as empty or unknown.

BRIEF SUMMARY OF THE DISCLOSURE

The present disclosure relates to Deep Packet Inspection (DPI) application classification systems and methods, namely, to enrich and improve application classification. Specifically, the systems and methods utilize domain name information to enrich the DPI application classification. The objective of the present disclosure is to enrich application classification, namely, to ensure a larger volume of records and traffic has its application determined. Further, the application classification is more detailed, e.g., Google-services instead of just Google, or Facebook-cloud instead of just Facebook. The present disclosure includes obtaining a Fully Qualified Domain Name (FQDN), such as from various protocols including, for example, Domain Name System (DNS), Hypertext Transfer Protocol (HTTP), Secure Sockets Layer (SSL), Quick UDP (User Datagram Protocol) Internet Connections (QUIC), and the like. The present disclosure is looking for a domain name (also referred to as a hostname or Server Name Indication (SNI)). The present disclosure utilizes an automatic pattern matching approach to classify any FQDN looking at the domain, including regional and local aspects of the domain, to classify the application. The present disclosure can include the extraction of the domain name through regular expressions. After the domain name, the present disclosure includes using a dictionary and regular expressions to apply secondary rules from other parts of the FQDN to determine an application.

Advantageously, this approach works on any FQDN and not simply worldwide well-known sites. Also, the present disclosure enables application classification where there is a Content Delivery Network (CDN) and/or Content Provider in the FQDN, and the CDN is different from the application (e.g., YouTube is an application from Google as the Content Provider). Even further, the present disclosure enables application classification when a site is hosted by a hosting company (e.g., Amazon Web Services (AWS), Akamai, etc.). The net effect of this approach was to significantly increase the number of CDRs that had an application identified as well as to identify the application on the vast majority of traffic in terms of volume. That is, as is shown herein, the DPI enrichment described herein expands application classification by more than 8× with it enabled.

In various embodiments, the present disclosure includes a method, a server configured to implement steps, and instructions, such as stored in a non-transitory computer-readable medium, for programming a processor to perform the steps. The steps include obtaining a packet; determining a hostname associated with the packet; utilizing a main rule to extract a domain from the hostname; and analyzing the domain and the hostname with a plurality of secondary rules based on the domain to deduce an application therefrom. The steps can further include periodically or based on new applications, updating the main rule and the plurality of secondary rules.

The main rule includes a regular expression to obtain the domain, and the plurality of secondary rules include zero or more rules that are matched based on the domain and each of the zero or more rules includes a pattern that is matched in the hostname to a corresponding application based on such a match. The main rule identifies the domain, and wherein the plurality of secondary rules are used with the hostname to yield the application from matching expressions in the hostname. The hostname can be determined through one or more protocols associated with the packet, and wherein the one or more protocols include any of Domain Name System (DNS), Hypertext Transfer Protocol (HTTP), Secure Sockets Layer (SSL), and Quick User Datagram Protocol (UDP) Internet Connections (QUIC).

The domain can be a Content Delivery Network (CDN) and the plurality of secondary rules are matched to the CDN to yield the application from matching expressions in the hostname. The hostname can be a Fully Qualified Domain Name (FQDN). The hostname may be unavailable as being missing due to a protocol of the packet or encrypted, and the hostname can be determined based on an Internet Protocol (IP) address of a sender of the packet.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a table of application results without the process of FIG. 1 (left side) and with the process of FIG. 1 (right side) illustrating the effect of the DPI enrichment.

FIG. 3 is a table of application results detected from the hostname and domain.

FIG. 4 is a table of domain extraction (left side) and domain extraction plus refinement with the rules (right side).

FIG. 5 is a table of an example configuration file with one MAIN rule and 147 secondary rules.

DETAILED DESCRIPTION OF THE DISCLOSURE

Again, the present disclosure relates to Deep Packet Inspection (DPI) application classification systems and methods, namely, to enrich and improve application classification. Specifically, the systems and methods utilize domain name information to enrich the DPI application classification. The objective of the present disclosure is to enrich application classification, namely, to ensure a larger volume of records and traffic has its application determined. Further, the application classification is more detailed, e.g., Google-services instead of just Google, or Facebook-cloud instead of just Facebook. The present disclosure includes obtaining an FQDN, such as from various protocols, including, for example, DNS, HTTP, SSL, QUIC, and the like. The present disclosure is looking for a domain name (also referred to as a hostname or Server Name Indication (SNI)). That is, the hostname may be a Fully Qualified Domain Name (FQDN) ("Internet Users' Glossary," FYI 18, RFC 1983), grouped into the DNS Namespace Hierarchy controlled by ICANN. The present disclosure utilizes an automatic pattern matching approach to classify any FQDN looking at the domain, including regional and local aspects of the domain, to classify the application. The present disclosure can include the extraction of the domain name through regular expressions. After the domain name, the present disclosure includes using a dictionary and regular expressions to apply secondary rules from other parts of the FQDN to determine an application.

Advantageously, this approach works on any FQDN and not simply worldwide well-known sites. Also, the present disclosure enables application classification where there is a Content Delivery Network (CDN) and/or Content Provider in the FQDN, and the CDN is different from the application (e.g., YouTube is an application from Google as the Content Provider). Even further, the present disclosure enables application classification when a site is hosted by a hosting company (e.g., Amazon Web Services (AWS), Akamai, etc.). The net effect of this approach was to significantly increase the number of CDRs that had an application identified as well as to identify the application on the vast majority of traffic in terms of volume. That is, as is shown herein, the DPI enrichment described herein expands application classification by more than 8× with it enabled.

DPI Enrichment Process

Figure 1:
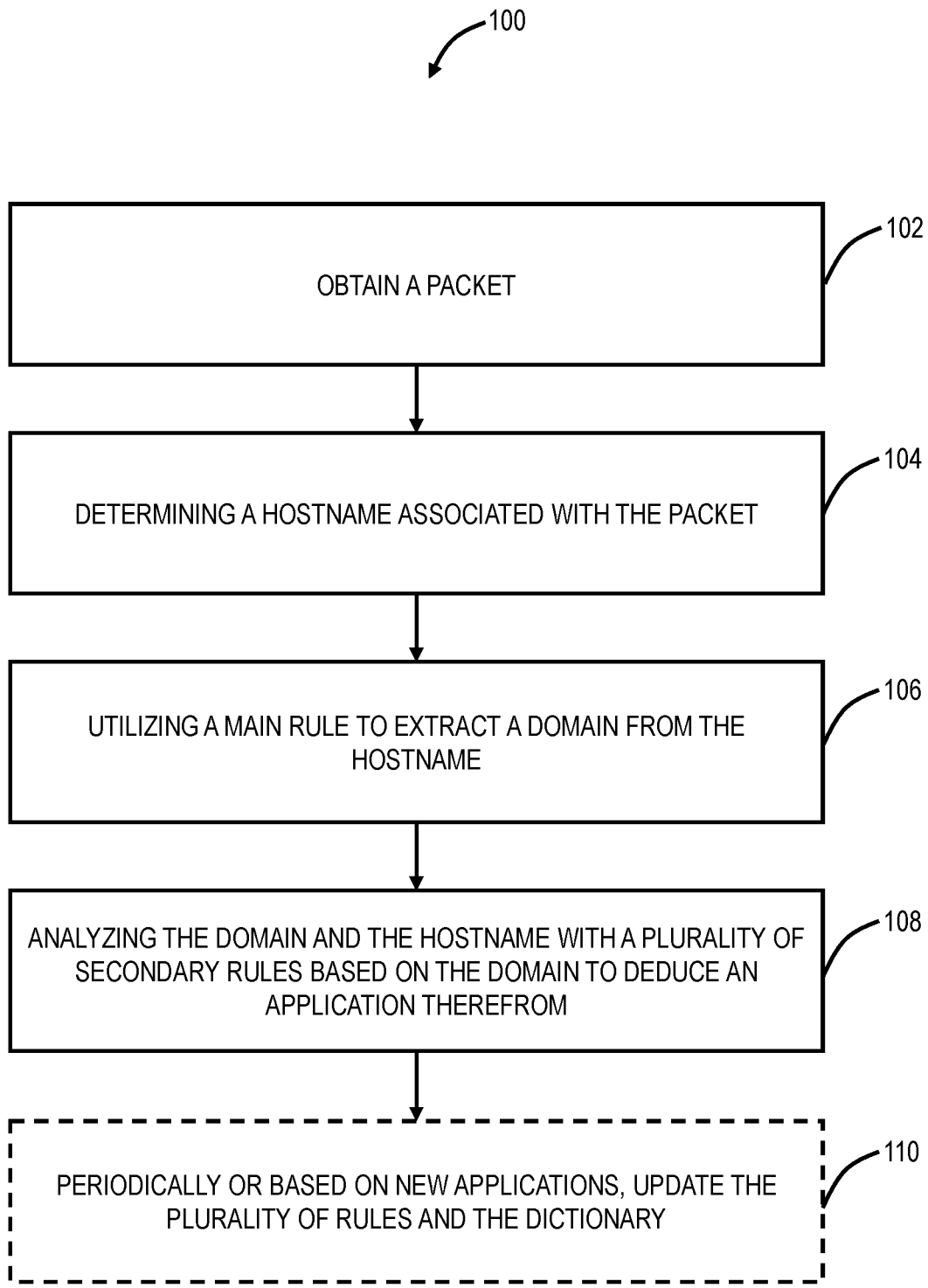
FIG. 1 is a flowchart of a process for DPI enrichment.
Figure 6:
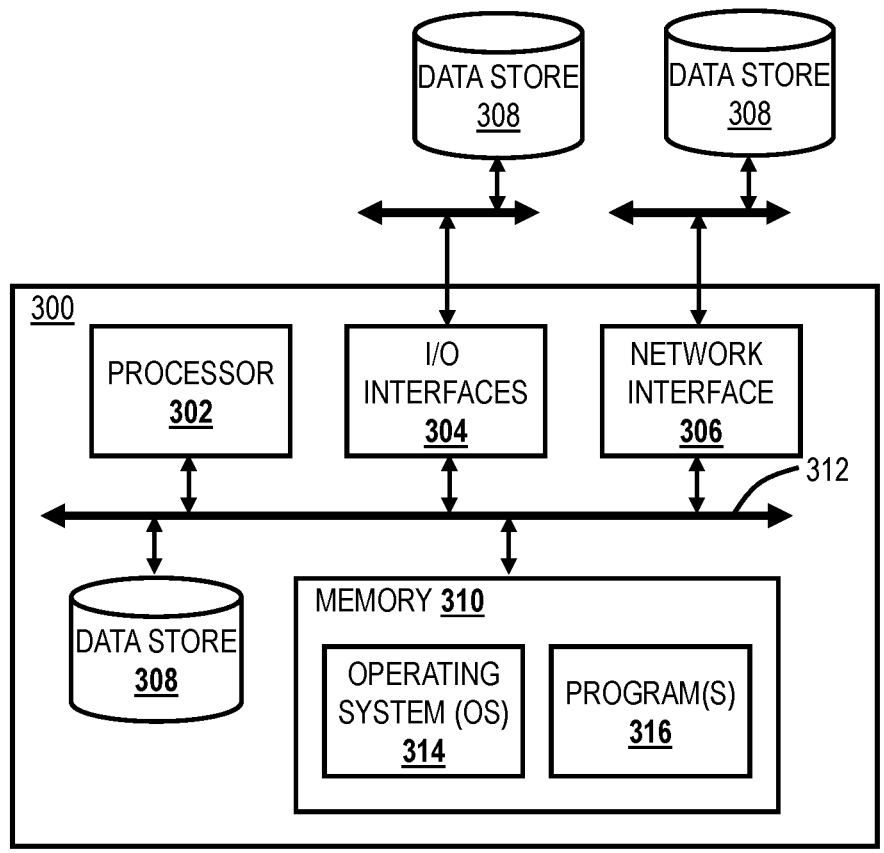
FIG. 6 is a block diagram of a processing device that may be used for a network monitoring system and/or to implement the process of FIG. 1.

FIG. 1 is a flowchart of a process 100 for DPI enrichment. The process 100 can be a computer-implemented method, instructions embodied in a non-transitory computer-readable medium, and/or implemented by a server, such as illustrated in FIG. 6. The process 100 includes obtaining a packet (step 102); determining a hostname associated with the packet (step 104); utilizing a main rule to extract a domain from the hostname (step 106); and analyzing the domain and the hostname with a plurality of secondary rules based on the domain to deduce an application therefrom (step 108).

The process 100 can also include, periodically or based on new applications, updating the main rule and the plurality of secondary rules. Here, the main rule and the plurality of secondary rules are updated for new domains and new applications.

The main rule includes a regular expression to obtain the domain, and the plurality of secondary rules include zero or more rules that are matched based on the domain and each of the zero or more rules includes a pattern that is matched in the hostname to a corresponding application based on such a match. That is, the main rule identifies the domain, and wherein the plurality of secondary rules are used with the hostname to yield the application from matching expressions in the hostname.

The packet is obtained based on network monitoring. The packet could be analyzed in real-time, from a log, etc. Various approaches are contemplated for obtaining the packet. The hostname can be the FQDN, and this can be obtained from various protocols, including, for example, DNS, HTTP, SSL, QUIC, and the like.

In an embodiment, the domain is a Content Delivery Network (CDN) and the plurality of secondary rules are matched to the CDN to yield the application from matching expressions in the hostname.

In another embodiment, the hostname is unavailable as being missing due to a protocol of the packet or encrypted, and the hostname is determined based on an Internet Protocol (IP) address of a sender of the packet.

The process 100 is dedicated to complement DPI classification by deducing new DPI application values from a hostname, in two general steps, namely extraction of a domain from a hostname and application of some heuristic rules to deduce an application from the domain and the complete hostname.

A complete hostname (FQDN) includes from right to left of a top domain, a domain, and optionally sub-domains, i.e., <subdomain2>.<subdomain1>.<domain>.<top_domain>. Details are described in RFC 2396, "Uniform Resource Identifiers (URI): Generic Syntax," August 1998, the contents of which are incorporated herein by reference. For example, some hostnames with associated domains and applications are as follows:

| HOSTNAME | DOMAIN | APPLICATION |
| --- | --- | --- |
| www.lemonde.fr | lemonde | lemonde |
| program.bbc.co.uk | bbc | bbc |
| static.xx.fbcdn.net | fbcdn | facebook |
| scontent.flos5-l.fna.fbcdn.net | fbcdn | Facebook-cloud |
| instagram.flos5-l.fna.fbcdn.net | fbcdn | Instagram |

The first principle is to extract, from the FQDN, the first and most significant domain name, after the top-level domain, reading from right to left. A regular expression can be used as a technique to parse the FQDN and extract the domain. Then according to a dictionary and regular expressions, secondary rules may give application names from other domain parts of the FQDN.

The plurality of rules can be configured, updated, etc. A MAIN rule can be used to extract the domain from the hostname. The MATCH value='MAIN' identifies the MAIN rule; the PATTERN value is a regular expression used from extraction.

| MATCH | PATTERN | APPL |
|---|---|---|
| MAIN | (?:^[^.]\.)*(?<name>[^.]+)(?=(?:(?:\.(?:co\|com\|edu\|gc\|go\|gov\|mob\|net\|or\|org\|os\|uc))?\.[a-z]{2,})$) | MAIN |

Secondary rules are used to deduce a valid application value from the domain and other patterns in the hostname. Valid means consistent with the dictionary and a meaningful value. That is, once the domain is identified, the secondary rules are used to parse the hostname to determine patterns to identify the application. The secondary rules contain a MATCH value and a PATTERN. The MATCH value is used as a key in the secondary rules based on the extracted domain. The PATTERN, when not empty, is a secondary regular expression to check for a secondary pattern, and an APPLICATION is the deduced application value when the pattern matches. The secondary rules are applied one after one, in the declaration order, and the first match gives the result, ignoring the remaining secondary rules.

For example, some examples of secondary rules may include

| MATCH | PATTERN | APPL | COMMENT |
|---|---|---|---|
| fbcdn | instagram\.[^.] s* | instagram | if parse == fbcdn check whether hostname contains 'instagram' pattern, |
| fbcdn | fna.fbcdn | facebook-cloud | if parse == fbcdn check whether hostname contains 'fna' pattern, then application |
| fbcdn | | facebook | if parse == fbcdn, default application is facebook |

The following illustrate FQDN examples.

Example 1: www.lemonde.fr—The MAIN rule extracts domain='lemonde,' and as there are no secondary rules, the deduced application value is the extracted value, namely 'lemonde.'

Example 2: instagram.flos5-1.fna.fbcdn.net—The MAIN rule extracts domain='fbcdn,' and three rules are found with that key (see the above table). A first secondary rule will succeed: the pattern matches for the 'instagram\.' pattern, so the deduced application value is 'instagram.'

Example 3: scontent.flos5-1.fna.fbcdn.net—The MAIN rule extracts domain='fbcdn,' and three rules are found with that key (again, see the above table). The first secondary rule will fail: the pattern does not match for 'instagram\.' Pattern. The second secondary rule will succeed: the pattern matches for 'fna.fbcdn' pattern, so the deduced application value is 'facebook-cloud.'

Example 4: static.xx.fbcdn.net—The MAIN rule extracts domain='fbcdn', and three rules are found with that key (again, see the above table). The first secondary rule will fail: the pattern does not match for 'instagram\.' Pattern. The second secondary rule will fail: the pattern does not match for 'fna.fbcdn' pattern. The third secondary rule will succeed: as the pattern is empty, it is a default rule so it cannot fail, so the deduced application value is 'facebook.'

Note, in the examples 2-4, the domain is a Content Delivery Network (CDN), and there are a plurality of secondary rules for the CDN to derive the application.

In another embodiment, if the hostname or FQDN is unavailable, such as a protocol not supporting the FQDN information or it is hidden by encryption, a server IP address of a stream (e.g., transported by UDP, Transmission Control Protocol (TCP), etc.) can be used to look up relevant information in the dictionary for determining the application. For example, the server IP address can be used to determine the hostname, instead of obtaining it from the packet. Here, the IP address can be determined from the packet, and a lookup can be performed to determine the hostname that matches the IP address.

The process 100 can be implemented in conjunction with an existing DPI system. Also, the process 100 can be used to evaluate log data (e.g., TCP Data Records (TCPDR)) of monitored user traffic.

The MAIN and secondary rules can be updated and modified as needed. For example, these rules may be stored in a setting file. Updates can include 1) a modification of the MAIN rule if the extraction is not correct for some cases and 2) the addition of a secondary rule when application value is not the desired one.

For example, for the first case 1), assume the hostname='company.biz.uk.' The main rule with extract 'biz' but the desired domain is 'society.' To solve this issue, the MAIN pattern is updated with this top domain part: (?:^[^.]\.)*(?<name>[^.]+)(?=(?:(?:\.(?:co\|com\|edu\|gc\|go\|gov\|mob\|net\|or\|org\|os\|uc\|biz))? \.[a- 2]{2,})$).

For example, for the second case 2), assume the hostname='cdn113-fs2.h-hotels.com.' The main rule with extract 'h-hotels'; this is the correct domain but not the desired deduced value. To solve this issue, a secondary rule can be added. In that case, a default value (no pattern) is enough:

| MATCH | PATTERN | APPL | COMMENT |
|---|---|---|---|
| h-hotels | | hhotels | if parse == 'h-hotels', default application is 'hhotels' |

Example Operations

FIG. 2 is a table of application results without the process 100 (left side) and with the process 100 (right side) illustrating the effect of the DPI enrichment. Without the process 100, 95 distinct applications were reported, and over 20% of the volume of traffic is unclassified. With the process 100, a significant number of new applications are detected, namely, over 700 distinct applications were reported, more than an 8× improvement. Further, the volume without an application was improved by 5×.

FIG. 3 is a table of application results detected from the hostname and domain. As is seen here, different DPI applications are determined from different hostnames. Specifically, local applications are detected from a domain.

FIG. 4 is a table of domain extraction (left side) and domain extraction plus refinement with the rules (right side). On the left side, a simple extraction is provided to determine the domain, and this is used to provide the application. On the right side, the secondary rules are run on the hostname, thereby providing local applications, e.g., google-ads versus google.

FIG. 5 is a table of an example configuration file 200 with one MAIN rule and 147 secondary rules. The configuration file 200 includes a match, a pattern, an application, and a comment section. Again, the match is used as a key, e.g., the domain=fbcdn, then apply the associated patterns with "fbcdn." The pattern illustrates a pattern that should be present in the hostname to yield the corresponding application.

Network Monitoring System

FIG. 6 is a block diagram of a processing device 300, which may be used for a network monitoring system. The processing device 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 6 depicts the processing device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the processing device 300, a semiconductor-based microprocessor (in the form of a microchip or chipset), or generally any device for executing software instructions. When the processing device 300 is in operation, the processor 302 is configured to execute software stored within the memory 310, to communicate data to and from the memory 310, and to generally control operations of the processing device 300 pursuant to the software instructions. The I/O interfaces 304 may be used to receive user input from and/or for providing system output to one or more devices or components. The user input may be provided via, for example, a keyboard, touchpad, and/or a mouse.

The network interface 306 may be used to enable the processing device 300 to communicate over a network. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the processing device 300, such as, for example, an internal hard drive connected to the local interface 312 in the processing device 300. Additionally, in another embodiment, the data store 308 may be located external to the processing device 300, such as, for example, an external hard drive connected to the I/O interfaces 304 (e.g., SCSI or USB connection). In a further embodiment, the data store 308 may be connected to the processing device 300 through a network, such as, for example, a network-attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming a processor to perform the steps of:
obtaining a packet;
determining a hostname associated with the packet;
utilizing a main rule to extract a domain from the hostname;
identifying one or more secondary rules associated with the extracted domain; and
identifying an application in response to a match between one of the identified one or more secondary rules and a portion of the hostname including steps of
identifying a first application in response to a match between a first one of the one or more secondary rules matching a first portion of the hostname; and
identifying a second application in response to no match between the first one of the one or more secondary rules and the hostname and a match between a second one of the one or more secondary rules matching a second portion of the hostname.

2. The non-transitory computer-readable medium of claim 1, wherein the instructions are further programmed to cause the processor to perform the steps of
periodically or based on new applications, updating the main rule and the plurality of secondary rules.

3. The non-transitory computer-readable medium of claim 1, wherein the main rule includes a regular expression to obtain the domain, and the plurality of secondary rules include zero or more rules that are matched based on the domain and each of the zero or more rules includes a pattern that is matched in the hostname to a corresponding application based on such a match.

4. The non-transitory computer-readable medium of claim 1, wherein the main rule identifies the domain, and wherein the plurality of secondary rules are used with the hostname to yield the application from matching expressions in the hostname.

5. The non-transitory computer-readable medium of claim 1, wherein the hostname is determined through one or more protocols associated with the packet, and wherein the one or more protocols include any of Domain Name System (DNS), Hypertext Transfer Protocol (HTTP), Secure Sockets Layer (SSL), and Quick User Datagram Protocol (UDP) Internet Connections (QUIC).

6. The non-transitory computer-readable medium of claim 1, wherein the domain is a Content Delivery Network (CDN) and the plurality of secondary rules are matched to the CDN to yield the application from matching expressions in the hostname.

7. The non-transitory computer-readable medium of claim 1, wherein the hostname is unavailable as being missing due to a protocol of the packet or encrypted, and the hostname is determined based on an Internet Protocol (IP) address of a sender of the packet.

8. A method comprising the steps of:
obtaining a packet;
determining a hostname associated with the packet;
utilizing a main rule to extract a domain from the hostname;
identifying one or more secondary rules associated with the extracted domain; and
identifying an application in response to a match between one of the identified one or more secondary rules and a portion of the hostname including steps of
identifying a first application in response to a match between a first one of the one or more secondary rules and a first portion of the hostname; and
identifying a second application in response to no match between the first one of the one or more secondary rules and the hostname and a match between a second one of the one or more secondary rules matching a second portion of the hostname.

9. The method of claim 8, further comprising
periodically or based on new applications, updating the main rule and the plurality of secondary rules.

10. The method of claim 8, wherein the main rule includes a regular expression to obtain the domain, and the plurality of secondary rules include zero or more rules that are matched based on the domain and each of the zero or more rules includes a pattern that is matched in the hostname to a corresponding application based on such a match.

11. The method of claim 8, wherein the main rule identifies the domain, and wherein the plurality of secondary rules are used with the hostname to yield the application from matching expressions in the hostname.

12. The method of claim 8, wherein the hostname is determined through one or more protocols associated with the packet, and wherein the one or more protocols include any of Domain Name System (DNS), Hypertext Transfer Protocol (HTTP), Secure Sockets Layer (SSL), and Quick User Datagram Protocol (UDP) Internet Connections (QUIC).

13. The method of claim 8, wherein the domain is a Content Delivery Network (CDN) and the plurality of secondary rules are matched to the CDN to yield the application from matching expressions in the hostname.

14. The method of claim 8, wherein the hostname is unavailable as being missing due to a protocol of the packet or encrypted, and the hostname is determined based on an Internet Protocol (IP) address of a sender of the packet.

15. A server comprising:
one or more processors; and
memory storing instructions that, when executed, cause the one or more processors to
obtain a packet;
determine a hostname associated with the packet;
utilize a main rule to extract a domain from the hostname;
identify one or more secondary rules associated with the extracted domain; and
identify an application in response to a match between one of the identified one or more secondary rules and a portion of the hostname, wherein the instructions are configured to identify the application by
identification of a first application in response to a match between a first one of the one or more secondary rules and a first portion of the hostname; and
identification of a second application in response to no match between the first one of the one or more secondary rules and the hostname and a match between a second one of the one or more secondary rules matching a second portion of the hostname.

16. The server of claim 15, wherein the instructions that, when executed, further cause the one or more processors to periodically or based on new applications, update the main rule and the plurality of secondary rules.

17. The server of claim 15, wherein the main rule includes a regular expression to obtain the domain, and the plurality of secondary rules include zero or more rules that are matched based on the domain and each of the zero or more rules includes a pattern that is matched in the hostname to a corresponding application based on such a match.

* * * * *